United States Patent
Erickson et al.

(12) 
(10) Patent No.: US 7,410,604 B2
(45) Date of Patent: Aug. 12, 2008

(54) METHOD OF MAKING RETROREFLECTIVE SHEETING AND SLOT DIE APPARATUS

(75) Inventors: Stanley C. Erickson, Scandia, MN (US); James C. Breister, Oakdale, MN (US); Gregory H. Van Erem, Stillwater, MN (US); David W. Meitz, St. Paul, MN (US); Stephen W. Mohn, St. Paul, MN (US); Paul DeRoussel, Hudson, WI (US)

(73) Assignee: 3M Innovative Properties Company, St. Paul, MN (US)

(*) Notice: Subject to any disclaimer, the term of this patent is extended or adjusted under 35 U.S.C. 154(b) by 277 days.

(21) Appl. No.: 10/382,375

(22) Filed: Mar. 6, 2003

(65) Prior Publication Data

US 2004/0173920 A1    Sep. 9, 2004

(51) Int. Cl.
*B29C 47/12* (2006.01)
*B29D 11/00* (2006.01)

(52) U.S. Cl. .................. 264/216; 264/1.6; 264/1.9

(58) Field of Classification Search .......... 264/212, 264/214, 40.5, 167, 1.9, 1.6, 2.7; 425/380, 425/466, 461, 141, 325, 327
See application file for complete search history.

(56) References Cited

U.S. PATENT DOCUMENTS

| | | | |
|---|---|---|---|
| 3,515,778 A * | 6/1970 | Fields et al. ............... | 264/40.5 |
| 3,684,348 A | 8/1972 | Rowland | |
| 3,689,346 A | 9/1972 | Rowland | |
| 3,712,707 A | 1/1973 | Henkes, Jr. | |
| 3,811,983 A | 5/1974 | Rowland | |
| 3,956,056 A | 5/1976 | Boguslawski et al. | |
| 4,025,159 A | 5/1977 | McGrath | |
| 4,145,173 A * | 3/1979 | Pelzer et al. ............... | 425/224 |
| 4,478,769 A | 10/1984 | Pricone et al. | |
| 4,486,363 A | 12/1984 | Pricone et al. | |
| 4,576,850 A | 3/1986 | Martens | |
| 4,588,258 A | 5/1986 | Hoopman | |
| 4,596,063 A | 6/1986 | Reifenhauser et al. | |
| 4,601,861 A | 7/1986 | Pricone et al. | |
| 4,675,230 A | 6/1987 | Innes | |
| 5,067,432 A * | 11/1991 | Lippert .................... | 118/413 |
| 5,117,304 A | 5/1992 | Huang et al. | |
| 5,122,049 A | 6/1992 | Baumgarten | |
| 5,156,863 A | 10/1992 | Pricone et al. | |
| 5,558,740 A | 9/1996 | Bernard et al. | |
| 5,643,400 A | 7/1997 | Bernard et al. | |
| 5,679,383 A * | 10/1997 | Ryan et al. ............... | 425/141 |
| 5,691,846 A * | 11/1997 | Benson et al. ............ | 359/530 |
| 5,928,679 A | 7/1999 | Ohki et al. | |
| 5,945,042 A * | 8/1999 | Mimura et al. ............ | 264/1.6 |

(Continued)

FOREIGN PATENT DOCUMENTS

EP    0 818 301    11/2001

(Continued)

*Primary Examiner*—Mathieu D. Vargot
(74) *Attorney, Agent, or Firm*—Carolyn A. Fischer

(57) ABSTRACT

The invention relates to a method of making retroreflective sheeting and other articles prepared from casting a fluid synthetic resin onto a tool having a microstructured surface with a slot die apparatus. The invention further relates to a slot die apparatus.

23 Claims, 4 Drawing Sheets

U.S. PATENT DOCUMENTS

| | | |
|---|---|---|
| 5,961,846 A | 10/1999 | Borchardt et al. |
| 6,159,407 A | 12/2000 | Krinke et al. |
| 6,200,399 B1 | 3/2001 | Thielman |
| 6,322,652 B1 | 11/2001 | Paulson et al. |
| 2002/0197348 A1 | 12/2002 | Rubhausen |

FOREIGN PATENT DOCUMENTS

| | | |
|---|---|---|
| EP | 0 796 716 | 1/2002 |
| FR | 1052780 | 1/1954 |
| GB | 1279299 | 6/1972 |
| WO | WO 95/11464 | 4/1995 |
| WO | WO 99/00196 | 1/1999 |

* cited by examiner

METHOD OF MAKING RETROREFLECTIVE SHEETING AND SLOT DIE APPARATUS

FIELD OF THE INVENTION

The invention relates to a method of making retroreflective sheeting and other articles prepared from casting a fluid synthetic resin onto a tool having a microstructured surface with a slot die apparatus. The invention further relates to a slot die apparatus.

BACKGROUND OF THE INVENTION

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Cube corner retroreflective sheeting typically comprises a thin transparent layer having a substantially planar front surface and a rear structured surface comprising a plurality of geometric structures, some or all of which include three reflective faces configured as a cube corner element.

Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroforming to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, direct machining techniques, and techniques that employ laminae.

For example, U.S. Pat. Nos. 3,684,348 and 3,811,983 describe retroreflective material and a method of making a composite material wherein a fluid molding material is deposited on a molding surface having cube corner recesses and a preformed body member applied thereto. The molding material is then hardened and bonded to the body member. The molding material may be a molten resin and the solidification thereof accomplished at least in part by cooling, the inherent nature of the molten resin producing bonding to the body member thereof. Alternatively, the molding material may be fluid resin having cross-linkable groups and the solidification thereof may be accomplished at least in part by cross-linking of the resin. The molding material may also be a partially polymerized resin formulation and wherein the solidification thereof is accomplished at least in part by polymerization of the resin formulation.

A slot die having a certain design has been used to cast molten polycarbonate onto a microprismatic tool surface for the production of retroreflective sheeting including retroreflective sheeting commercially available from 3M Company ("3M"), St. Paul, Minn. under the trade designation "3M Scotchlite Brand Reflective Sheeting 3990 VIP". The tool surface employed for making retroreflective sheeting comprises a plurality of recesses coming to a sharp point. As the line speed of the advancing tool under the die increases, incomplete filling of the recesses becomes evident as visible microscopic defects. Frequent and/or substantial incomplete filling of the recesses can result in diminished retroreflective performance.

A solution to this problem has been to increase the pressure at the coating die to force the fluid polymer into the tool surface. An extruder has been used to provide the molten polymer at the slot orifice at high pressures ranging up to 5000 psi (pounds per square inch). However, there are limits to this approach. The weight and bulk of the equipment needed to contain such high pressures becomes unwieldy. Further, the increased polymer pressure often causes leakage between the mating halves of the die resulting in production problems such as charred and degraded polymer dripping onto the tool, which damages the tool.

Accordingly, industry would find advantage in improved methods of making retroreflective sheeting and other microstructured articles that employ casting fluid synthetic resin onto a tool as well as a novel slot-die apparatus suitable for such methods of manufacture.

SUMMARY OF THE INVENTION

The present invention discloses a method of making microstructured articles and in particular retroreflective sheeting comprising advancing a tool having a surface comprising a plurality of microstructured cube corner elements (e.g. cavities), casting a fluid resin onto said tool surface with a slot die apparatus, solidifying the resin forming a sheet, and removing the sheet from the tool. The slot die apparatus employed in the present invention differs from the slot die apparatus formerly employed to manufacture retroreflective sheeting.

In one embodiment, the method employs a slot die apparatus capable of building die force by the interaction of the die lips with the fluid resin moving under the lips by means of the advancing tool. In one aspect, the resin is provided at the orifice with a slot pressure and the resin contacts an area of the lips creating an average pressure between the advancing tool and the area of the lips such that the average pressure is greater than half the slot pressure.

In another embodiment, the slot die apparatus comprises a downstream lip comprising at least two surface portions having a different slope at a line of adjacency, the line of adjacency being the line formed at the location the adjacent surface portions meet. Preferably, at least one of the surface portions forms a converging profile with the advancing tool surface. The surface portions may be planar and/or curved. Further curved surface portions may have a different radius of curvature at the line of adjacency.

In another embodiment, the slot die apparatus comprises an extended downstream lip, such lip having a length of greater than 0.5 inches (1.27 cm).

In another embodiment, the slot die apparatus comprises a slot orifice between an upstream lip and a downstream lip, both lips having a leading edge and trailing edge. A first gap is present between the leading edge of the downstream lip and the tool in a direction normal to the tool. A second gap is present between the trailing edge of the downstream lip and the tool in a direction normal to the tool. The second gap is independently adjustable relative to the first gap. Preferably, the second gap is independently adjustable to a fixed position.

In other embodiments, the method of making microstructured articles (e.g. retroreflective sheeting) comprises any combination of such embodiments, as would be understood by one of ordinary skill in the art.

The invention further discloses a slot die apparatus comprising a slot orifice between an upstream lip and downstream lip wherein the downstream lip comprises least two surface portions having a different slope at a line of adjacency. The surface portions preferably further comprise a hinge such that at least one edge of one surface portion, such as the trailing edge of the downstream die lip is independently adjustable.

In one aspect, the slot die apparatus is capable of providing a die force of greater than 400 pounds/linear inch (pli) with a slot pressure of less than 1000 pounds/square inch (psi).

BRIEF DESCRIPTION OF THE DRAWINGS

In the several figures of the attached drawing, like parts bear like reference numerals, and.

DETAILED DESCRIPTION OF THE PREFERRED EMBODIMENTS

Figure 1A:
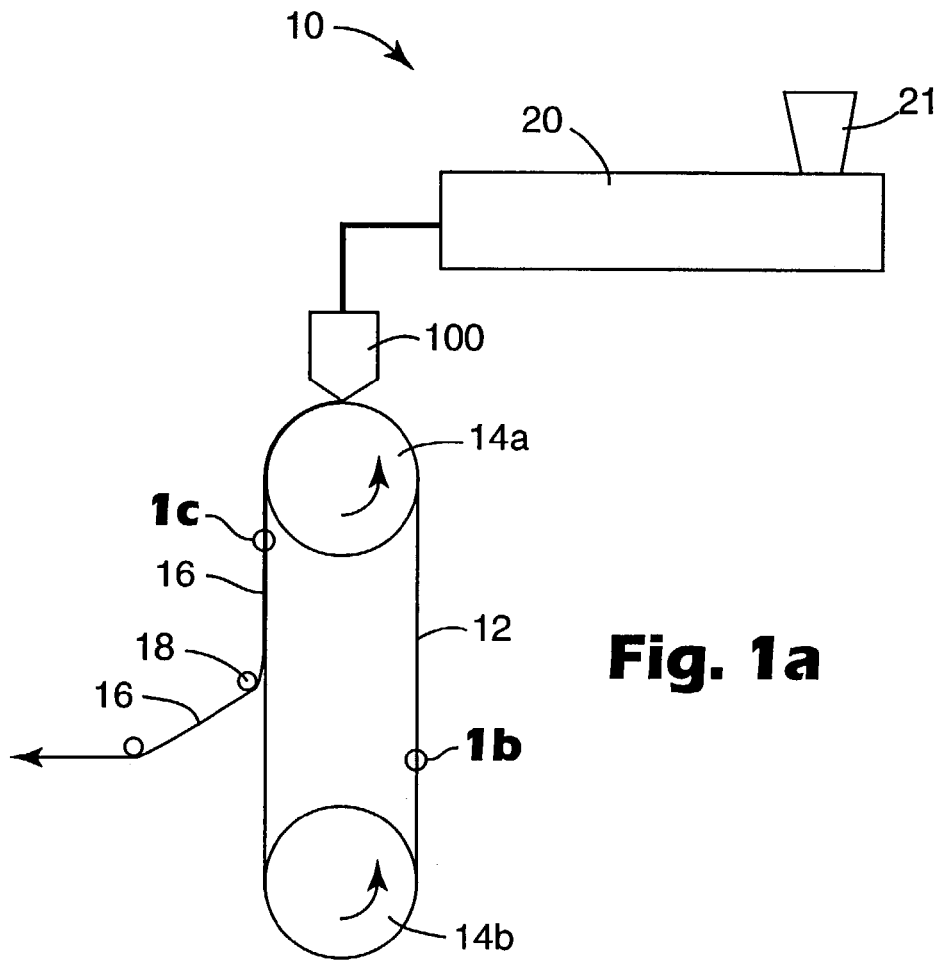
FIG. 1a is a side view of an exemplary method of extruding molten polymeric resin onto a tool with a slot die according to the present invention.

The method and apparatus of the invention relate to making microstructured sheeting articles such as retroreflective sheeting.

As used herein, "slot die apparatus" refers to an apparatus comprising a cavity that includes a resin distribution portion, the arrangement of which can be of various designs (e.g. coat hanger, T-slot, etc.) wherein the cavity terminates in a slot orifice provided between a pair of die lips. The slot orifice is typically rectangular. Slot die apparatus are typically equipped with various other components such as adjusting bolts, electrical heaters, thermocouples, etc. as are known in the art. The dimensions of the slot orifice may vary. For example the width may vary from 0.010 inches to 0.1 inches; whereas the length may vary from 2 inches to 60 inches (i.e. width of the coating line).

As used herein, "sheeting" refers to a thin piece of polymeric (e.g. synthetic) material. The sheeting may be of any width and length, such dimension only being limited by the equipment (e.g. width of the tool, width of the slot die orifice, etc.) from which the sheeting was made. The thickness of retroreflective sheeting typically ranges from about 0.004 inches (0.1016 mm) to about 0.10 inches (2.54 mm). Preferably the thickness of retroreflective sheeting is less than about 0.012 inches (0.3048 mm) and more preferably less than about 0.010 inches (0.254 mm). In the case of retroreflective sheeting, the width is typically at least 30 inches (122 cm) and preferably at least 48 inches (76 cm). The sheeting is typically continuous in its length for up to about 50 yards (45.5 m) to 100 yards (91 m) such that the sheeting is provided in a conveniently handled roll-good. Alternatively, however, the sheeting may be manufactured as individual sheets rather than as a roll-good. In such embodiments, the sheets preferably correspond in dimensions to the finished article. For example, the retroreflective sheeting, may have the dimensions of a standard U.S. sign (e.g. 30 inches by 30 inches (76 cm by 76 cm) and thus the microstructured tool employed to prepare the sheeting may have about the same dimensions.

As used herein, "microstructured" refers to at least one major surface of the sheeting comprising structures having a lateral dimension (e.g. distance between groove vertices of the cube corner structures) of less than 0.25 inches (6.35 mm), preferably less than 0.125 inches (3,175 mm) and more preferably less than 0.04 inches (1 mm). The lateral dimension, particularly of cube corner elements, is preferably less than 0.020 inches (0.508 mm) and more preferably less than 0.007 inches (0.1778 mm). The microstructures have an average height ranging from about 0.001 inches (0.0254 mm) to 0.010 inches (0.254 mm), with a height of less than 0.004 inches (0.1016 mm) being most typical. Further, the smallest lateral dimension of a cube corner microstructure us typically at least 0.0005 inches (0.0127 mm). Cube corner microstructures may comprise either cube corner peaks or, preferably, cube corner cavities.

As used herein, "casting" refers to forming a moldable resin into a sheet having a microstructured surface by contacting the moldable resin with a microstructured mold surface. The moldable resin is preferably sufficiently fluid such that it may be extruded, pumped or poured onto a molding tool having the microstructured surface. The viscosity of the resin may vary widely. Polymerizable resins are often low to moderate viscosity liquids, whereas thermoplastic resins may be relatively viscous at the casting temperature.

Although the method of the invention is described with particular reference to making retroreflective sheeting comprising cube corner microstructures, the method may be used with other microstructured articles as well, such as hook and loop fasteners, linear grooves and Fresnel lenses.

The method of making retroreflective sheeting via casting a hardenable fluid synthetic resin, in the absence of the invention described herein (e.g. employing the slot die apparatus described herein), is generally known from for example U.S. Pat. No. 3,811,983 (Rowland); U.S. Pat. No. 3,689,346 (Rowland); and U.S. Pat. No. 5,961,846 (Benson Jr.).

Figure 1B:
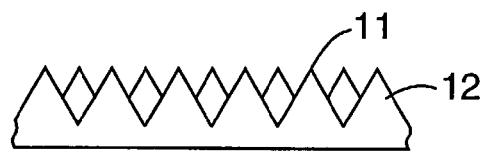
FIG. 1b is an enlarged view of the tool.
Figure 1C:
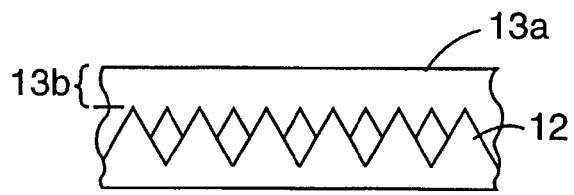
FIG. 1c is an enlarged view of the resin on the tool.

With reference to FIG. 1a-1c, a representative manufacturing apparatus and process 10 includes advancing a tool 12 having a microstructured surface 11, by means for example of drive rolls 14a and/or 14b; casting a fluid synthetic resin onto the microstructured surface of the tool with a slot die apparatus 100, the slot die apparatus having certain characteristics as will subsequently be described; allowing the resin to sufficiently harden (i.e. solidify) while in contact with the tool forming a sheet 16; and removing the sheet from the tool. In the case of continuous production, the leading edge of the sheeting is removed from the tool surface with for example stripper roll 18.

Although the slot die apparatus and advancing tool are depicted in a vertical arrangement, horizontal or other arrangements (i.e. angles between horizontal and vertical) may also be employed. Regardless of the particular arrangement, the slot die apparatus provides the fluid resin to the microstructured tool at the orifice of the slot die apparatus, preferably in a direction normal to the tool. In addition, the manufacturing process may include multiple slot die apparatus arrangements. For example, a first slot die apparatus may be provided to partially fill the cube cavities followed by a second slot die provided to fill the remainder of the cavity.

The die is mounted in a substantial mechanical framework that is capable of being moved towards the advancing tool surface by suitable means such as jackscrews or hydraulic cylinders. Alternatively, the die may be stationary and the advancing tool surface moved towards the die. When the die is about 0.020 inches from the tool, the fluid synthetic resin (e.g. molten thermoplastic polymeric material) contacts the tool forming a continuous layer of the resin on the microstructured tool surface. The resin is of a viscosity such that it flows, optionally with applied vacuum, pressure, temperature, ultrasonic vibration, or mechanical means, into the cavities in the molding surface. It is preferably applied in sufficient quantity that it substantially fills the cavities. In a preferred embodiment, the fluid resin is delivered at a rate such that the final land thickness of the sheeting (i.e. the thickness excluding that portion resulting from the replicated microstructure, 13*b* in FIG. 1*c*) is between 0.001 and 0.100 inches and preferably between 0.003 and 0.010 inches. With reference to FIG. 1*c*, the surface 13*a* of the resin (e.g. solidified) opposing the tool surface is generally smooth and planar. Alternatively, however, the resin may be delivered in a manner such that the cube cavities alone are filled and thus the sheeting is substantially free of a land layer. In this embodiment the cube corner elements are typically bonded to a film layer prior to removal from the tool surface.

In the case of extrusion of molten thermoplastic resins, the resin is typically initially provided in a solid pellet form and poured into hopper 21 that continuously feeds the resin into a melt extruder 20. Heat is typically supplied to the tool by passing over the drive roll that is heated for example with circulating hot oil or by electric induction to maintain a tool surface temperature above the softening point of the polymer. Suitable cooling means such as spraying water onto the extruded resin or tool, contacting the unstructured surface of the tool with cooling rolls, or direct impingement air jets provided by high-pressure blowers are provided after extrusion to sufficiently harden the resin such that it may be removed from the tool.

In the case of polymerizable resins, the resin may be poured or pumped directly into a dispenser that feeds slot die apparatus 100. For embodiments wherein the polymer resin is a reactive resin, the method of manufacturing the sheeting further comprises curing the resin in one or more steps. For example the resin may be cured upon exposure to a suitable radiant energy source such as actinic radiation, ultraviolet light, visible light, etc. depending upon the nature of the polymerizable resin to sufficiently harden the resin prior to removal from the tool. Combinations of cooling and curing may also be employed.

Figure 2:
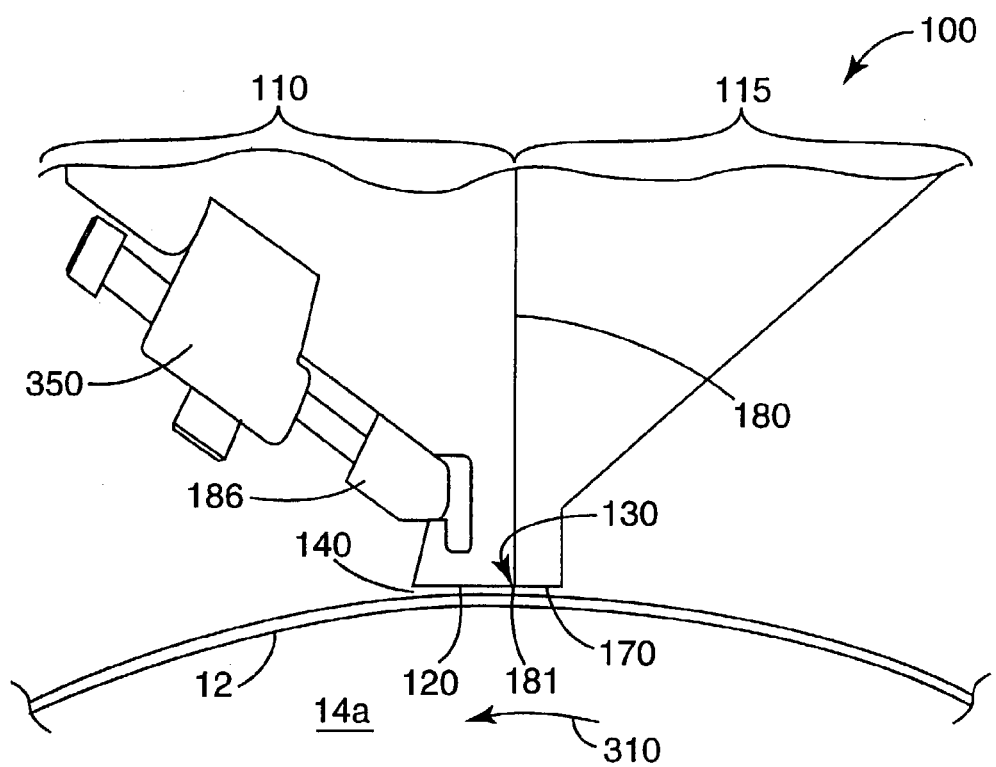
FIG. 2 is a side view of an exemplary slot die apparatus for use in the method of the invention.
Figure 3:
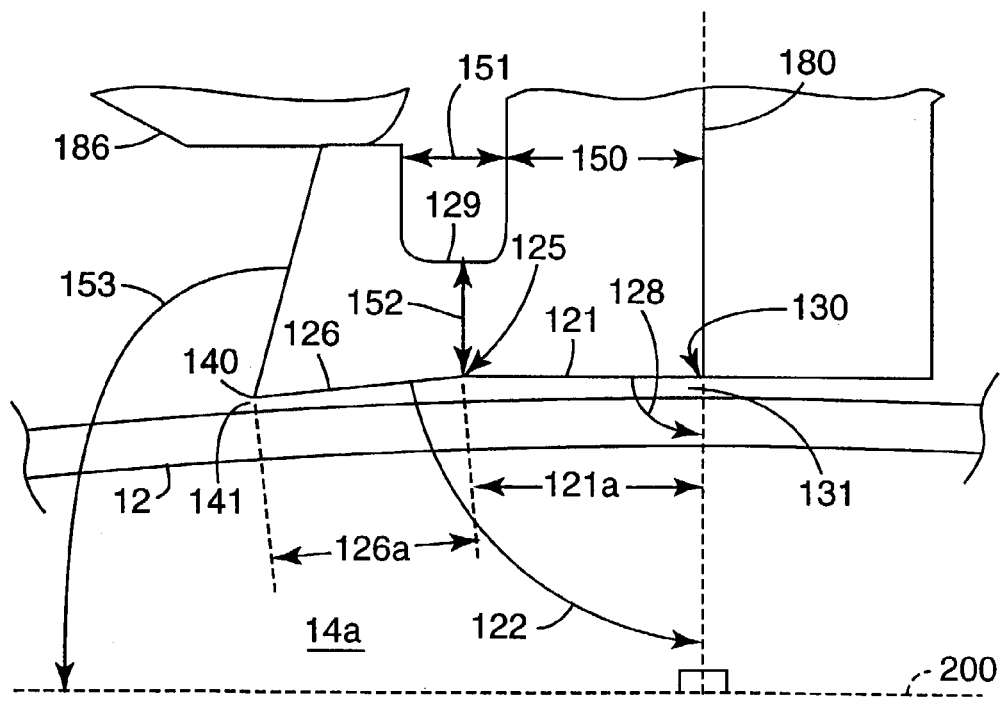
FIG. 3 depicts a detailed side view of an exemplary slot die apparatus of the invention.

With reference to FIGS. 2-3, the slot die apparatus 100 comprises two portions, a first die portion 110 and a second die portion 115. The first and second die portions are joined together at the die parting line 180 creating a slot cavity (not shown) having a rectangular slot orifice 181. Adjacent to the slot orifice 181 and downstream of it relative to the direction of rotation 310 of roll 14*a*, is a first die lip 120, also referred to herein as the downstream lip. Adjacent to the slot orifice 181, and upstream of it relative to the direction of rotation 310 of roll 14*a*, is a second die lip 170, also referred to herein as the upstream lip. These lips are brought into close proximity to the continuously advancing moving tool 12 having a microstructured surface. The drive roll 14*a* is built to resist high die loading forces while maintaining overall roll surface deflection of less than 0.001 inches over the working face of the roll.

The slot die apparatus of the present invention differs from the slot die apparatus formerly employed commercially by 3M to manufacture retroreflective sheeting via extrusion of molten polycarbonate.

In one aspect, the slot die apparatus differs from the slot die apparatus formerly employed in that a slot die apparatus is provided that is capable of generating higher die force and/or higher average pressure by the interaction of the die lips with the fluid resin moving under the lips.

As demonstrated in the forthcoming examples, the slot die apparatus formerly employed provided a die force ranging from about 300 pounds/linear inch (pli) to about 380 pli for slot pressures ranging from about 850 pound/square inch (psi) to about 1100 psi. The slot die apparatus described herein can advantageously provide a die force in excess of 400 pli with a slot pressure of less than 1000 psi. With a slot pressure ranging from about 600 psi to about 900 psi, the die force of the slot die apparatus presently employed has been demonstrated to exceed 600 pli. Accordingly, higher die forces can be obtained without the high slot pressures that caused leakage between the mating halves of the previous slot die apparatus.

Slot pressure is calculated by subtracting the free flow gate pressure from the casting gate pressure. The gate pressure is measured by a pressure transducer at the gate on the end of the extruder The casting gate pressure is the gate pressure measured while the die is casting molten resin under normal replication conditions onto the microstructured tool surface. The free flow pressure is the pressure drop through the extrusion system from the extruder gate to the slot die orifice. The free flow pressure is determined by positioning the die several inches above the tool surface and allowing the molten resin to be collected in a container and recording the gate pressure using the same extruder set points (e.g. revolutions per minute, volume flow rate of resin) as the casting gate pressure conditions. Die force is measured by load cells bolted to the main support in such a manner that the load cells detect and display the net load developed by the molten resin interacting with the die lips. Die force is typically measured in unit force, e.g. pounds. Further the die force may be divided by the width of the lip (e.g. pli) to compare different width dies. As used herein, "average pressure" refers to the die force divided by the area of the die lips that contact the resin while manufacturing the microstructured article (e.g. retroreflective sheeting), i.e. while the tool is advancing and the die is in close proximity to the tool. The area of the lips contacting the resin includes the entire area of the downstream lip as well as typically up to 50% of the upstream lip. The portion of the upstream lip that contacts the resin while making the microstructured article can be estimated by inspecting the upstream lip immediately after operation. Typically the outer perimeter portion of the upstream lip that contacts the resin is bordered by a burn mark.

Without intending to be bound by theory, it is surmised that higher die force aids in the diffusion and dissolution of the gas that was formerly in the tool cavities into the polymeric resin before solidification of the resin. By redistributing the pressure, the pressure supplied at the slot die orifice can significantly be reduced, yet complete filling of the microstructures (e.g. cube corner cavities) is achieved. The die force generated under the downstream lip typically ranges from about 250 to 1500 pli. Even higher die forces pressures could be achieved by for example extending the length of the die lip (e.g. 1.5 inches, 2 inches, 3 inches) and/or providing suitable lip geometry as will subsequently be described.

Increased die force and increased average pressure are amenable to faster production rates. As set forth in the forthcoming examples, a die force of less than about 380 pli resulted in good replication fidelity for line speeds of 10 fpm (feet per minute). However, the replication fidelity was poor at 14 fpm, 18 fpm and higher. As used herein "good replication fidelity" refers to the solidified sheeting comprising 1% or less by area of unfilled inclusions, whereas in "poor replication fidelity" the area of unfilled inclusions is greater than 1%, typically greater than 2% and more typically about 3% or greater. In cube corner sheeting the unfilled portions often appear in retroreflection as six small bubbles at the tip of the structure due to the six separate paths light may travel through a cube corner. The percentages of unfilled inclusions can be determined by aid of magnification (e.g. 10×) as described in the forthcoming examples. Since the method of the invention employs a slot die apparatus capable of providing a die force in excess of 400 pli, line speeds in considerable excess of 14 fpm were obtained. For example, with a die force ranging from about 600 pli to 650 pli, line speeds ranging from 14 fpm to 20 fpm resulted in good replication fidelity.

The applicants surmise that the die force and average pressure of the slot die apparatus formerly employed was limited to the slot pressure exerted by the melt train extruder or melt pump at least in part because the profile of the downstream lip had a planar geometry. The method of making microstructured articles of the invention preferably employs a novel slot die apparatus wherein the downstream lip comprises at least two different surface portions. Further the different surface portions are preferably joined such that a continuous surface is formed throughout the length (as depicted in FIG. 3) and width of the surface of the lip that contacts the resin. The downstream lip may comprise two or more different planar surface portions such as the first planar surface portion 121 and the second planar surface portion 126, as depicted in FIG. 3. Alternatively, the downstream lip may comprise two or more curved surface portions or combinations of at least one planar surface portion and at least one curved surface portions. The radius of curvature may be different when two or more curved surface portions are utilized. As used herein "different surface portions" refers to adjacent surface portions comprising a discontinuity in either the first or second derivative at the line of adjacency 125 relative to reference plane 200, the reference plane being positioned below the slot die apparatus and normal to an extrapolation of die parting line 180 as depicted in FIG. 3. For embodiments wherein the die parting line is angled, the reference plane would be positioned tangent to roll 14a at top dead center (i.e. the intersection of the tangent with a line perpendicular to the tangent passing through the center of the roll). For example, different slope results in having a different first derivative at the line of adjacency. Similarly, adjacent planar and/or curved surface portions may have a constant first derivative or slope at the line of adjacency but a discontinuity in the second derivative. Surface portions may advantageously be defined relative to a reference plane, the reference plane 200 being normal to die parting line 180 and positioned below the slot die apparatus as depicted in FIG. 3.

The surface portion(s) may be angled such that the trailing edge of the surface portion is closer to the tool surface, i.e. angles ranging from greater than 0° to less than 90° (i.e. negative slope) as measured counter clockwise from the lip surface to the die parting line. Alternatively the surface portion may be angled such that the trailing edge is further from the tool surface, i.e. angles ranging from greater than 90° to less than 180° (i.e. positive slope) as measured counter clockwise from the lip surface to the die parting line. Although the downstream lip may also comprise one or more surface portions that are parallel to the reference plane, the downstream lip preferably comprises at least one surface portion (e.g. the surface portion comprising the trailing edge) that is angled or curved in a radius of curvature similar to that of the advancing tool.

In the case of two planar surface portions, it is preferred that the upstream surface portion of the downstream lip has an angle ranging from about 88° to about 92° as measured counterclockwise from the lip surface to an extrapolation of the die parting line 180, as depicted in FIG. 3. Further, the downstream surface portion of the downstream lip preferably has an angle ranging from about 85° to about 95° as measured counterclockwise from the lip surface to an extrapolation of the die parting line 180, as depicted in FIG. 3.

With reference to FIG. 3 an exemplary die comprises a downstream lip having a total length of about 1.0 inch (e.g. 0.88 inches) having two surface portions. The first surface portion extends from the leading edge 130 to the trailing edge of the first surface portion 125 (i.e. also the leading edge of the second surface portion and the line of adjacency for the two surface portions) having a length 121a of 0.41" and an angle 128 of 89.2° degrees to vertical as measured counterclockwise from the lip surface to an extrapolation of die parting line 180, as depicted in FIG. 3. The second surface portion extends from the trailing edge of the first surface portion 125 having a length 126a of 0.47" and an angle 122 of 86.8° degrees to vertical as measured counterclockwise from the lip surface to an extrapolation of die parting line 180, as depicted in FIG. 3. Further, the downstream lip comprises sufficient structural strength to resist flexing or deflection due to the high pressure developed between the lip surface portions and the advancing tool.

The novel slot die apparatus may have the same general design as described in U.S. Pat. No. 5,067,432 (Lippert) with the exception that the downstream lip is replaced with a lip insert comprising two different surface portions as just described. The downstream lip of the novel slot die apparatus may also be made integral with the die and thus be made by modifying a commercially available die so as to include two different surface portions. Suitable dies that are amenable to such modification include slot die apparatus commercially available from Extrusion Dies, Inc., Chippewa Falls, Wis. under the trade designations "Ultracoat" and "Ultraflex".

Depending of the geometry of the surface portion relative to the advancing tool, parallel, converging or diverging profiles are created. In the case of converging profiles, the surface portion is angled or curved toward the tool surface and/or the gap between the surface portion and the tool surface decreases with respect the direction of rotation 310. For diverging profiles, the surface portion is angled or curved away from the tool surface. Parallel surface profiles result when the surface portion has the same angle or curvature as the tool surface. Converging and diverging profiles may exist under a single surface portion e.g when a planar surface portion is used with a curved tool surface. By the selection of suitable converging and/or diverging lip geometry combinations, it is surmised that the pressure can be made to increase at each converging surface portion and/or decrease at each diverging surface portions repeatedly along the length of the downstream lip.

Although the slot die apparatus of the invention may comprise two or more diverging downstream lip surface portions in the absence of at least one converging surface portion for the application of low viscosity polymeric materials, it is preferred that the downstream lip comprise at least one converging surface portion, and preferably two or more converging surface portions. Further, the at least one converging surface portion is typically the surface portion having trailing edge 140. The downstream lip may comprise diverging and parallel surface portions in combination with converging surface portions, as previously described.

In another aspect, the method of the invention differs in that it employs a slot die apparatus comprising an extended downstream lip 120. During manufacture, the extended lip 120 increases the residence time of the synthetic resin between the microstructured tool surface and the downstream die lip. The length of the downstream lip, i.e. the distance between the leading edge 130 and trailing edge 140 is typically at least about 0.5 inches, preferably at least 0.8 inches and more preferably at least 1.0 inch. Typically, the downstream lip is considerably longer than the upstream lip. For example, the length of the downstream lip may be about 1 inch (2.54 cm) in combination with the length of the upstream lip being 0.50 inches (1.27 cm).

The surface portions of the downstream lip may be fixed. However, in another aspect alternatively or in addition to the features of the downstream lip previously described (i.e. at least two different surface portions and/or extended downstream lip), at least one of the surface portions of the slot die apparatus is independently adjustable. Preferably, at least the surface portion 126 that comprises trailing edge 140 of the downstream lip 120 is independently adjustable in a direction approximately normal to the microstructured tool surface. In doing so, a first gap 131 that is present between the leading edge 130 of the downstream lip 120 and the tool surface 11 can be different than a second gap 141 that is present between the trailing edge 140 of the downstream lip 120 and the tool surface 11.

With reference to FIG. 3, the downstream lip 120 preferably comprises two different surface portions 121 and 126, joined at the location of a hinge 129. The hinge may be created by thinning the height of the downstream lip at a location near the area where the surface portions meet. Force is applied to adjust surface portion 126 by means of wedge 186, as depicted in FIG. 3. Force may be applied to the wedge by any suitable means including thermal, electrical, or mechanical actuators as are known in the art, such as the mechanical actuator 350, as shown in FIG. 2. Preferably, each surface portion comprises a separate means for applying force enabling each surface portion to be independently adjustable.

While the microstructured sheeting (e.g. reiroreflective sheeting) is being manufactured, the gap 131 between the leading edge of the downstream lip 120 (e.g. first surface portion) and the tool surface is typically less than about two times that of the final sheeting thickness. Accordingly, the gap ranges from about 0.004 inches to 0.030 inches when producing sheeting with a nominal thickness of 0.0025 inches to 0.015 inches. However, the second gap 141 between the trailing edge 140 of the downstream lip 120 (e.g. second surface portion) may vary in view of the independent adjustment such that it is greater than or less than the first gap. Preferably, the second gap is less than the first gap.

Although the surface portions can be adjusted during manufacturing (i.e. while fluid resin is being cast onto the advancing tool), the surface portions of the downstream extended lip are constrained to a fixed position once adjusted. The surface portions are not self-adjusting, meaning that the lip is relatively inflexible such that the distance between the lip and the tool only substantially changes (i.e. by more than 0.001") as a result of the force applied to adjust the surface portion by for example the mechanical actuator (e.g. via 350 of FIG. 2). The surface portions are typically manually adjusted. However the surface portion(s) may be adjusted by automated means as are known in the art. For example, U.S. Pat. No. 4,594,063 describes a die for a thermoplastic material with at least one output-gap-defining adjustable lip, an opposing gap-bounding lip, at least one adjusting element working on the output-gap defining die lip as well as a control and adjusting device for the thickness of the extruded plastic product. The adjusting element is associated with and operated at least partially by the control and adjusting element. A field translator such as a piezotranslator or a magnetostriction translator may be employed as the adjusting element.

The upstream lip may further comprise any of the features described herein with reference to the downstream lip. Further, the slot die apparatus may further include other components and functionality as commonly known in the slot die apparatus art.

The tool used herein is typically obtained by first manufacturing a master mold that has a structured surface. Method of manufacturing master molds are known. Master molds employed for making retroreflective sheeting are typically prepared from pin-bundling techniques, direct machining techniques, and techniques that employ laminae, as described in the art. The master mold is then replicated using any suitable technique such as conventional nickel electroforming to produce a tool of a desired size for forming cube corner retroreflective sheeting. Electroforming techniques such as described in U.S. Pat. Nos. 4,478,769 and 5,156,863 (Pricone) as well as U.S. Pat. No. 6,159,407 (Krinke) are known. A plurality of replications are often joined together for example by welding such as described in U.S. Pat. No. 6,322,652 (Paulson).

The method and apparatus of the invention is suitable for use with any microstructure design, e.g. cube corner element design. For retroreflective sheeting, the tool has a molding surface having a plurality of microstructures, e.g. cube corner elements that are preferably cavities. The opening at the top surface of a cavity corresponds to the base of a resultant cube corner element.

In direct machining techniques, a series of grooves are formed in the surface of a planar substrate (e.g. metal plate) to a form a master mold comprising truncated cube corner elements. (see U.S. Pat. No. 3,712,707 (Stamm) and U.S. Pat. No. 4,588,258 (Hoopman)) The base edges of adjacent cube corner elements of truncated cue corner arrays are typically coplanar. Other cube corner element structures, described as "full cubes" or "preferred geometry (PG) cube corner elements" typically do not have coplanar base edges. Such structures typically exhibit a higher total light return in comparison to truncated cube corner elements. Full-cube and PG cube corner elements in plan view are non-triangular including but not limited to trapezoids, rectangles, quadrilaterals, pentagons, or hexagons. A preferred optical design is described in U.S. Provisional Application Ser. No. 60/452464, filed Mar. 6, 2003, titled "Lamina Comprising Cube Corner Elements and Retroreflective Sheeting", whereas a preferred technique of making a master mold is described in published U.S. patent application Ser. No. 2004/0175541-A1, filed Mar. 6, 2003, titled "Methods of Making Microstructured Lamina and Apparatus", both of which are incorporated herein by reference.

The microstructured tool can be made from polymeric, metallic, composite, or ceramic materials. A fluid synthetic resin is used to replicate the microstructure and is allowed to harden (i.e. solidify) while in contact with the tool. For embodiments wherein solidification of the resin will be performed by applying radiation through the tool, the tool should be sufficiently transparent to permit irradiation through the resin. Illustrative examples of materials from which tools for such embodiments can be made include polyolefins and polycarbonates. Metal tools are typically preferred particularly for the extrusion of molten thermoplastic resin as they can be formed in desired shapes and provide excellent optical surfaces to maximize retroreflective performance of a given cube corner element configuration. Thermoplastic resins are typically solidified via cooling. The tool is comprised of a suitable material (e.g. nickel) to ensure that the cavities will not deform during fabrication of the composite article diminishing the retroreflected brightness of the sheeting, and such that the array of cube corner elements can be separated therefrom after curing. Depending upon the tool used and the nature of the resin composition, the cured array may separate from the tool readily or a parting layer may be necessary to achieve desired separation characteristics. Illustrative examples of parting layer materials include an induced surface oxidation layer, an intermediate thin metallic coating, chemical silvering, and combinations of different materials or coatings. If desired, suitable agents may be incorporated into the resin composition to achieve desired separation characteristics.

Suitable resin compositions for the retroreflective sheeting of this invention are preferably transparent materials that are dimensionally stable, durable, weatherable, and readily formable into the desired configuration. Examples of suitable materials include acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly) ethylene-co-acrylic acid; polyesters; polyurethanes; and cellulose acetate butyrates. Polycarbonates are particularly suitable because of their toughness and relatively high refractive index, which generally contributes to improved retroreflective performance over a wider range of entrance angles. Injection molding grade polycarbonate having a melt flow rate ranging from 17 g/10 min. to 24 g/10 min. (ASTM D1238 or ISO 1133-1991; condition 300/1.2) is typically preferred. These materials may also include dyes, colorants, pigments, UV stabilizers, or other additives. Although transparent synthetic resins are employed in the manufacture of retroreflective sheeting, in the case of other microstructured articles, the synthetic resin may be opaque or translucent as well.

In the case of molten polymeric resins, the resin typically solidifies as a function of sufficient cooling. For example, polycarbonate sufficiently cools upon reaching a temperature of about 240° F. or lower. Cooling can be achieved by any means including by spraying water onto the extruded resin or tool, contacting the unstructured surface of the resin or tool with cooling rolls, or my means of direct impingement air jets provided by high-pressure blowers.

Other illustrative examples of materials suitable for forming the array of cube corner elements are reactive resin systems capable of being cross-linked by a free radical polymerization mechanism by exposure to actinic radiation, for example, electron beam, ultraviolet light, or visible light. Additionally, these materials may be polymerized by thermal means with the addition of a thermal initiator such as benzoyl peroxide. Radiation-initiated cationically polymerizable resins also may be used. Reactive resins suitable for forming the array of cube corner elements may be blends of photoinitiator and at least one compound bearing an acrylate group. Preferably the resin blend contains a monofunctional, a difunctional, or a polyfunctional compound to ensure formation of a cross-linked polymeric network upon irradiation.

Illustrative examples of resins that are capable of being polymerized by a free radical mechanism that can be used herein include acrylic-based resins derived from epoxies, polyesters, polyethers, and urethanes, ethylenically unsaturated compounds, isocyanate derivatives having at least one pendant acrylate group, epoxy resins other than acrylated epoxies, and mixtures and combinations thereof. The term acrylate is used here to encompass both acrylates and methacrylates. U.S. Pat. No. 4,576,850 (Martens) discloses examples of crosslinked resins that may be used in cube corner element arrays of the present invention.

The manufacture of the sheeting may include other optional manufacturing steps prior to or subsequent to solidification of the sheeting. For example, the retroreflective sheeting can be manufactured as a layered product by casting the cube-corner elements against a preformed film as taught in PCT application No. WO 95/11464 and U.S. Pat. No. 3,684,348, or by laminating a preformed film to preformed cube-corner elements. In doing so the individual cube-corner elements are interconnected by the preformed film. Further, the elements and film are typically comprised of different materials.

Alternatively or in addition thereto, specular reflective coating such as a metallic coating can be placed on the backside of the cube-corner elements. The metallic coating can be applied by known techniques such as vapor depositing or chemically depositing a metal such as aluminum, silver, or nickel. A primer layer may be applied to the backside of the cube-corner elements to promote the adherence of the metallic coating.

In addition to or in lieu of a metallic coating, a seal film can be applied to the backside of the cube-corner elements; see, for example, U.S. Pat. Nos. 4,025,159 and 5,117,304. The seal film maintains an air interface at the backside of the cubes that enables total internal reflection at the interface and inhibits the entry of contaminants such as soil and/or moisture.

Patents, patent applications, and publications disclosed herein are hereby incorporated by reference (in their entirety) as if individually incorporated. It is to be understood that the above description is intended to be illustrative, and not restrictive. Various modifications and alterations of this invention will become apparent to those skilled in the art from the foregoing description without departing from the scope of this invention, and it should be understood that this invention is not to be unduly limited to the illustrative embodiments set forth herein.

COMPARATIVE EXAMPLES 1-4

Retroreflective sheeting was prepared using a comparative die that has been employed to manufacture commercially available sheeting.

In operation, the die was mounted such that the parting line slot orifice was positioned horizontally 0.050" upstream of top dead center relative to a reference plane tangent to the roll at top dead center in a rigid framework having a die support beam and a jackscrew assembly for moving the die in a vertical plane so that it could be positioned at any distance from a heated roller. The jackscrew assembly was equipped with actuating motors on both sides of the support beam that were mounted with bolts to the die beam. The moving end of the jackscrew was threaded into a load cell that was bolted to the main support structure in a manner that the net load developed by the molten resin interacting with the die lips was transmitted through and sensed by the load cells. The load cells were connected to suitable electronics that provided a digital display of these die forces. The die was attached to a single screw extruder.

Injection molding grade polycarbonate having a melt flow rate ranging from 17 g/10 min. to 24 g/10 min. (ASTM D1238 or ISO 1133-1991; condition 300/1.2) was dried for 4 hours in a 250° F. drying hopper. The dried polycarbonate pellets were flood fed to the extruder inlet. The extruder barrel zone temperatures were set at 475° F. for Zone 1, 535° F. for Zone 2, 550° F. for Zone 3, 565° F. for Zone 4 and 570° F. for Zone 5. The gate exit zone temperature at the end of the extruder was set at 575° F. The polymer melt temperature and pressure were measured at the extruder gate using a melt thermocouple and a pressure probe respectively and are provided in TABLE 1. An adapter of 1.25 inch internal diameter (I.D.) connected the extruder gate and the die. The temperature on the adapter was set at 560° F. The die body was divided into 16 temperature zones, each temperature zone having approximately the same area. The downstream lip included sequential zones 1-8, whereas the upstream lip included sequential zones 9-16 with zones 1 and 16 being adjacent to one another yet on opposite sides of the slot orifice. The zone temperatures were set at 575° F. for Zones 1, 2, 7, 8, 9 and 10; 560° F. for Zones 3, 6, 11 and 14; 545° F. for Zones 4, 5, 12 and 13; and 570° F. for Zones 15 and 16.

The die was positioned so that the downstream lip was approximately 10 mils from the microprismatic surface of a tool that consisted of the inverse of the desired microprismatic design of the retroreflective sheeting. The tool will subsequently be described in greater detail. The microprismatic surface was on a continuous metal belt that was set at the line speed provided in Table 1. The microprismatic surface of the tool was presented to the die by wrapping the belt around a continuously driven heated roller built to resist high die loading forces while maintaining overall roller surface deflection less than 1 mil over the working face of the roller having a diameter of 30 inches. Heat was supplied to the roller by a hot oil system with a set point of 495° F. The tool surface temperature was measure with a contact pyrometer on both the left and right flat non-structured margins of the tooling as provided in TABLE 1.

The tool was about 20 feet in the downweb direction by about 3 feet in the crossweb direction. The tool included electroformed replication that were derived from a master mold consisting of an assembly of laminae having dimensions of about 2 inches (i.e. length of microprismatic surface of each lamina) by about 4 inches. The method of machining the lamina as well as the method of assembling and replicating the assembled laminae is described in published U.S. patent application Ser. No. 2004/0175541-A1, filed Mar. 6, 2003, titled "Methods of Making Microstructured Lamina and Apparatus" filed on the same day as the present application, incorporated herein by reference. The optical design formed in the lamina(e) is described in U.S. Provisional Application Ser. No. 60/452464, filed Mar. 6, 2003, titled "Lamina Comprising Cube Corner Elements and Retroreflective Sheeting" filed on the same day as the present application, incorporated herein by reference. A primary groove face extending substantially the full lamina length was formed on each lamina. The primary groove face was oriented at roughly 35.49° to the normal vector defined by the plane of the tool surface. Alternating pairs of side grooves with included angles of substantially 75.226° and 104.774° were formed in each lamina with a spacing of 0.005625 inches to produce the remaining faces of the cube corner cavities. The symmetry axes of the cubes corner cavities were canted sideways by about 6.03° in a plane parallel to and aligned within 1° of the plane defined by the laminae. The side grooves were formed substantially orthogonal to the primary groove face. The term substantially with regard to the side groove (i.e. included angles and orthogonal) refers to the side groove comprising a combination of 1/2 angle errors, skew and inclination, each of which are less than 1° for the purpose of introducing non-orthogonality to improve the retroreflected divergence profile. Further details concerning grooves comprising skew and/or inclination is found in previously cited in U.S. Provisional Application Ser. No. 60/452464, filed Mar. 6, 2003. The combination of 1/2 angle errors, skew and inclination is not believed to affect the replication fidelity.

Since the tool surface is a negative replica of the assembled laminae, adjacent primary groove faces of adjacent laminae form a ridge on the tool surface. Adjacent to this ridge and extending generally through the cube corner cavities parallel to the laminae orientation is a substantially continuous down web flow channel in the tool surface. The tool was provided to the slot die apparatus such the down web flow channel was normal to the slot orifice.

Photographs of retroreflective sheeting replicated from this tool are depicted in FIGS. 4 and 5. The horizontal dimensions of the cube cavities in FIGS. 4 and 5 is 0.0075 mils, corresponding to the thickness of the individual lamina. The trapezoidal cube corner cavities of individual lamina correspond to the vertical rows in FIGS. 4 and 5.

Molten polycarbonate exited from the die orifice onto the microprismatic surface of the tooling to form a continuous web of microreplicated sheeting. The extruder output speed was adjusted to provide a 12 mil nominal caliper of the sheeting. The die force was measured by the load cells built into the supporting framework.

The belt and web continued from the curved surface of the roll into a flat free span zone and were then cooled by blowing air through impingement nozzles until a temperature of less than 240° F. was reached. The web was then removed from the belt and wound into a roll of retroreflective sheeting.

The replication fidelity of each comparative retroreflective sheeting sample was evaluated by taking four 3"×5" samples from each of four locations across the web. Care was taken to ensure that the sixteen samples from each comparative example was taken from the same location. Each sample was laid under a microscope (Measurescope MM-11) at a 10× magnification and a photograph (camera was a Javelin SmartCam) was taken of the sample with the poorest replication. The photographs are depicted in FIG. 4a-4d. The unfilled inclusions of the cube cavities appear as black clusters at the center portion of each trapezoid, each trapezoid being the base edges of the cube corner element. The percentage of unfilled inclusions is approximated by measuring the surface area of the unfilled inclusions in plan view. A "pass" rating refers to 1% or less unfilled inclusions, whereas a "fail" rating refers to greater than 1% unfilled inclusions.

TABLE 1

|  | Comparative Example No. | | | |
| --- | --- | --- | --- | --- |
|  | 1 | 2 | 3 | 4 |
| Line Speed (fpm) | 10 | 14 | 18 | 20 |
| Extruder Speed (rpm) | 5 | 8 | 10 | 11 |
| Extruder Gate Melt Temperature (° F.) | 556 | 556 | 555 | 555 |
| Slot Pressure (psi) | 1080 | 872 | 854 | 868 |
| Extruder Gate Melt Pressure (psi) | 1740 | 1796 | 2042 | 2188 |

TABLE 1-continued

Figure 4A:
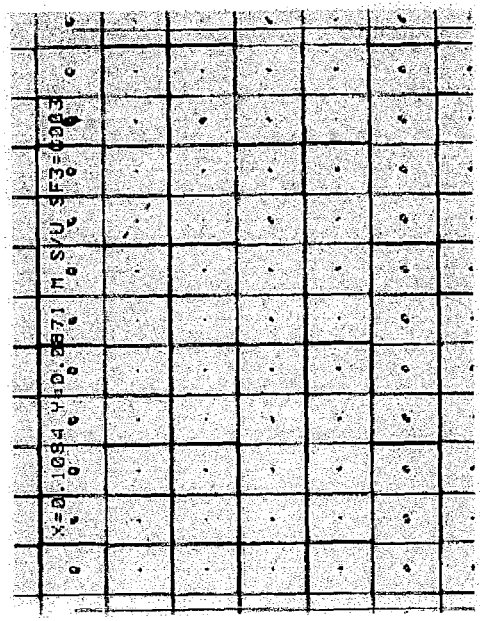
FIG. 4a-4d depict photographs of retroreflective sheeting prepared with a prior art slot die apparatus.
Figure 4B:
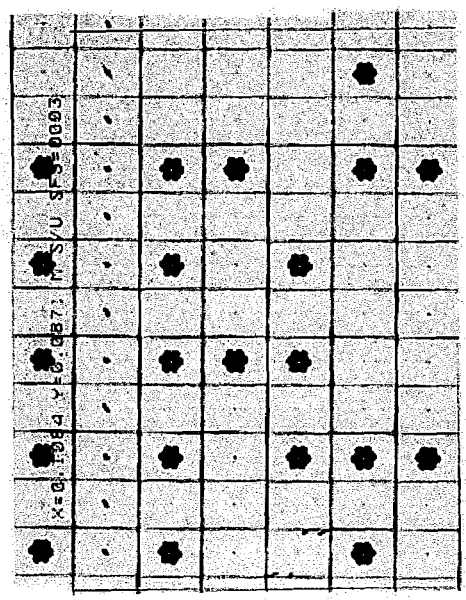
Figure 4C:
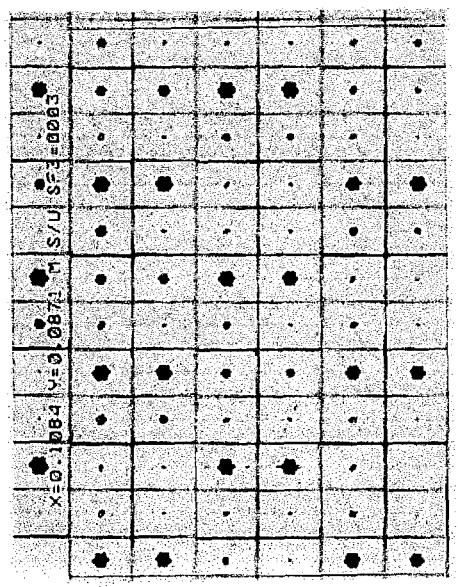
Figure 4D:
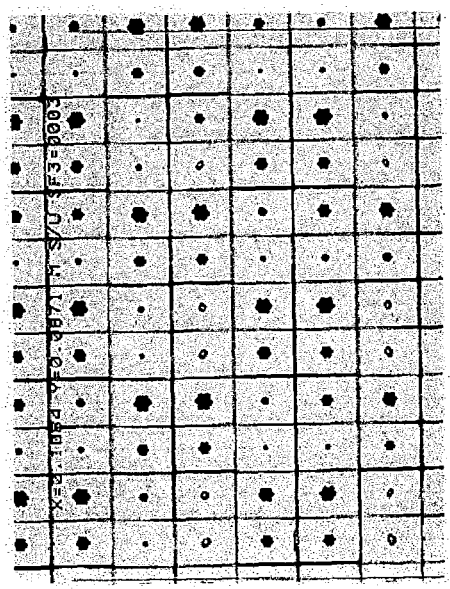

|  | Comparative Example No. | | | |
| --- | --- | --- | --- | --- |
|  | 1 | 2 | 3 | 4 |
| Tooling Temperature (average of left and right side of tool) - (° F.) | 423 | 406 | 401 | 400 |
| Die Force (pli) | 381 | 327 | 330 | 309 |
| Replication Fidelity | Pass<br>FIG. 4a<br><1% loss | Fail<br>FIG. 4b<br>3.7% loss | Fail<br>FIG. 4c<br>2.8% loss | Fail<br>FIG. 4d<br>3.0% loss |
| Die force divided by slot pressure (inches) | 0.4 | 0.4 | 0.4 | 0.4 |
| Ratio of die force/slot pressure/lip length (no units) | 0.4 | 0.4 | 0.4 | 0.4 |

The data in TABLE 1 show that the replication fidelity was determined to pass at a line speed of 10 fpm and fail at 14, 18 and 20 fpm.

EXAMPLES 5-8

Retroreflective sheeting was prepared as described in Comparative Examples 1-4 with a slot die apparatus that was substantially identical to a slot die apparatus commercially available from Extrusion Dies, Inc., Chippewa Falls, Wis. under the trade designation "Ultracoat" with the exceptions that the downstream die lip was changed to incorporate the following specific features: (1) the horizontal length of the lip was changed from 0.478" to 0.884"; (2) a section of the lip near the polycarbonate exit slot was thinned to provide a hinge in the horizontal section of the lip, thereby allowing the downstream portion of the lip to be adjusted in a vertical plane; (3) the polycarbonate contacting surface of this lip was machined to provide two planar surfaces, the first surface being at an angle of 89.2 degrees to vertical as measured counterclockwise from the tool surface to an extrapolation of the parting line of the die, and the second surface being 86.8 degrees to vertical counterclockwise as measured counterclockwise from the tool surface to an extrapolation of the parting line of the die; (4) die bolts were configured to push on the outboard or trailing section of the die lip, such that adjustments of the bolts resulted in a vertical displacement of the trailing lip while not substantially changing the polycarbonate slot between the front and rear die lips; (5) the lip was built from P-20 tool steel such that with reference to FIG. 3 dimension 150 had a thickness of 0.33 inches, 151 had a thickness of 0.26 inches, dimension 152 had a thickness of 0.19 inches and angle 153 was 105° relative to reference plane 200.

The slot die was run using the same conditions as detailed in Comparative Examples 1-4 with the measured values set forth in TABLE 2; except that the vertical position of the trailing die lip 126 was adjusted by turning all the die bolts ⅜ of one turn resulting in the trailing edge 140 of the second surface portion being 0.004" closer to the tool. This was done to optimize the converging profile lip geometry. Extruder RPM's were adjusted slightly in order that the comparison employed substantially the same extruder gate pressure as Table 1.

The replication fidelity was evaluated in the same manner as Comparative Examples 1-4. The samples of the sheeting were taken at locations corresponding to the same physical locations of the tool belt as Comparative Examples 1-4 to eliminate tooling variability. The photographs are depicted in FIG. 5a-5d.

TABLE 2

Figure 5A:
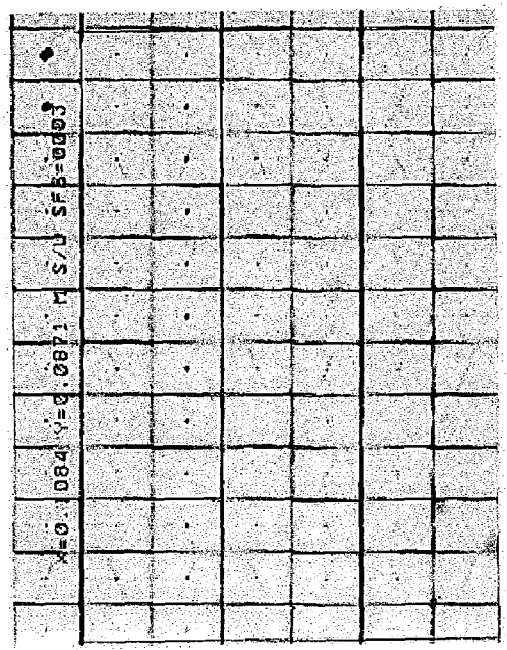
FIG. 5a-5d depict photographs of retroreflective sheeting prepared with an exemplary method and exemplary slot die apparatus of the invention.
Figure 5B:
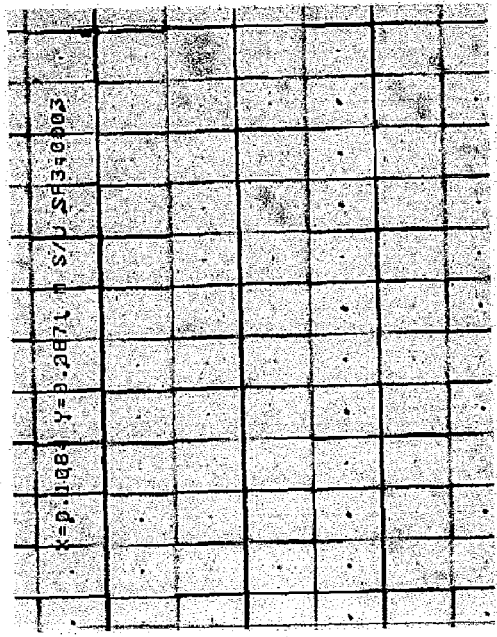
Figure 5C:
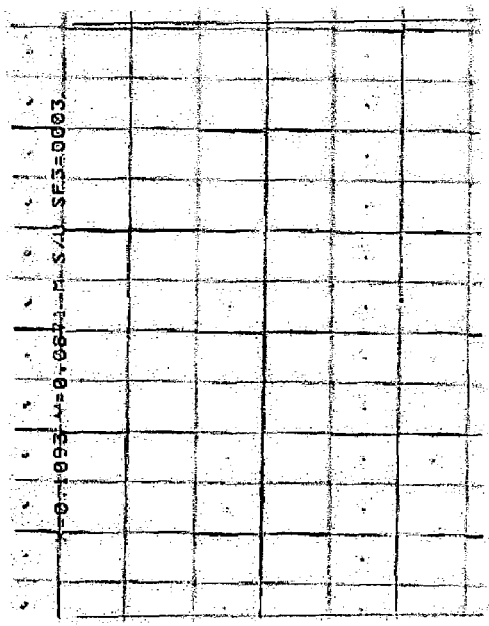
Figure 5D:
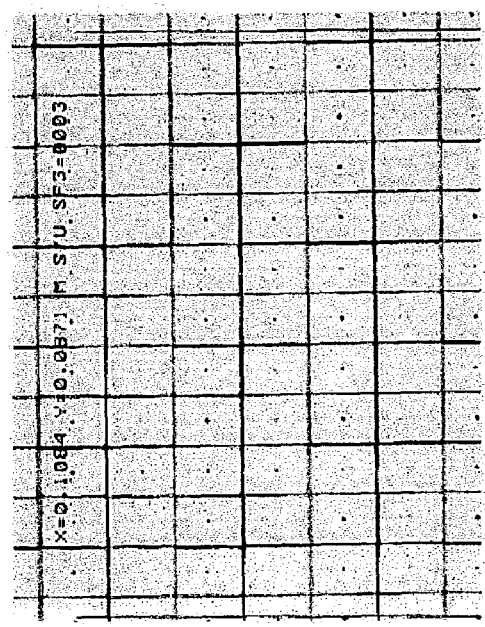

|  | Example No. | | | |
| --- | --- | --- | --- | --- |
|  | 5 | 6 | 7 | 8 |
| Line Speed (fpm) | 10 | 14 | 18 | 20 |
| Extruder Speed (rpm) | 7 | 9 | 11 | 13 |
| Extruder Gate Melt Temperature (° F.) | 561 | 563 | 561 | 561 |
| Slot Pressure (psi) | 886 | 730 | 785 | 661 |
| Extruder Gate Melt Pressure (psi) | 1789 | 1767 | 2164 | 2210 |
| Tool Temperature (° F.) | 425 | 405 | 400 | 398 |
| Die Force (pli) | 607 | 647 | 637 | 636 |
| Replication Fidelity | Pass<br>FIG. 5a<br><1% loss | Pass<br>FIG. 5b<br><1% loss | Pass<br>FIG. 5c<br><1% loss | Pass<br>FIG. 5d<br><1% loss |
| Die force divided by slot pressure (inches) | 0.7 | 0.9 | 0.8 | 1.0 |
| Ratio of die force/slot pressure/lip length (no units) | 0.5 | 0.6 | 0.6 | 0.7 |

The data in TABLE 2 show that at the approximate gate pressures set out in TABLE 1, the die force increased substantially for the examples of the invention.

Replication fidelity was judged as "Pass" at line speeds as high as 20 fpm.

Upon comparing Table I to Table II it is evident that die force as a function of slot pressure or die force as a function of slot pressure and the length of the lip contacting the resin is 0.4 for each of the comparative examples. In the method of the invention or with the apparatus of the invention the die force as a function of slot pressure was at least 0.5. For good replication with the stated manufacturing conditions die force as a function of slot pressure typically ranges from 0.5 to about 1.0. However, die force as a function of slot pressure may exceed 1.0 with other sets of manufacturing conditions.

A third set of data was generated with the extended lip die at the same run conditions as Example 5. As the number of turns (e.g. amount of rotation in the die bolts) increased, the edge 130 of the die moved closer to the tool the amount of die force per unit slot pressure increased as seen by the data reported in Table 4.

TABLE 4

| Die bolt turns | Die Force (pli) | Slot pressure (psi) | Die force divided by slot pressure (inches) |
| --- | --- | --- | --- |
| 0.7 | 500 | 840 | 0.60 |
| 0.8 | 800 | 750 | 1.07 |
| 0.9 | 920 | 660 | 1.39 |
| 1.0 | 1010 | 590 | 1.71 |
| 1.2 | 1220 | 630 | 1.94 |

The results show that the slot die apparatus is amenable to increasing die force independent of the slot pressure.

What is claimed is:

1. A method of making a microstructured article comprising:
    advancing a tool having a microstructured surface;
    casting a fluid resin onto said tool surface with a slot die apparatus having a cavity that terminates at a slot orifice between an upstream lip and downstream lip wherein the downstream lip that contacts the fluid resin comprises a first surface portion that extends from the slot orifice to a center portion of the downstream lip and a second surface portion that extends from the center portion of the downstream lip, the second surface portion having a different slope or curvature than the first surface portion and the slope or curvature of the second surface portion is independently adjustable relative to the first surface portion;
    solidifying the resin forming a sheet having a microstructured surface; and
    removing the sheet from the tool.

2. The method of claim 1 wherein the downstream lip comprises a leading edge and trailing edge and the second surface portion extends to the trailing edge.

3. The method of claim 1 wherein the downstream lip comprises at least two surface portions having a different slope at a line of adjacency.

4. The method of claim 1 wherein the slot die provides resin at the slot orifice with a slot pressure such that resin contacting an area of the lips creates an average pressure with an advancing tool and the average pressure is greater than half the slot pressure.

5. The method of claim 1 wherein the slot die provides a die force of greater than 400 pli with a slot pressure of less than 1000 psi.

6. The method of claim 1 wherein the surface portions are curved.

7. The method of claim 1 wherein the surface portions comprise a different radius of curvature.

8. The method of claim 1 wherein the downstream lip has a length of greater than 0.5 inches.

9. The method of claim 1 wherein the downstream lip comprises a leading edge and trailing edge, a first gap is present between the leading edge of the downstream lip and the tool in a direction normal to the tool, a second gap is present between the trailing edge of the downstream lip and the tool in a direction normal to the tool, and the second gap is independently adjustable relative to the first gap.

10. The method of claim 1 wherein the second gap is independently adjustable to a fixed position.

11. The method of claim 1 wherein the two surface portions comprise a hinge therebetween.

12. The method of claim 9 wherein the surface portion comprising the trailing edge is independently adjustable.

13. The method of claim 1 wherein the microstructured surface of the tool comprises a plurality of cube corner elements.

14. The method of claim 13 wherein the cube corner elements are cube corner cavities.

15. The method of claim 13 wherein the cube corner elements of the sheet comprise less than 1% by area of unfilled inclusions.

16. The method of claim 1 wherein the resin is a molten thermoplastic resin.

17. The method of claim 1 wherein the downstream lip comprises two or more converging surface portions.

18. The method of claim 1 wherein the lips are brought in close proximity to the advancing tool.

19. The method of claim 1 wherein the tool is provided on a rotating roll.

20. The method of claim 1 wherein the surface portions of the downstream lip are joined forming a continuous surface.

21. The method of claim 1 wherein the downstream lip comprises one or more surface portion that is angled or curved in a radius of curvature similar to that of the advancing tool.

22. The method of claim 1 wherein each surface portion comprises a separate means for applying force.

23. The method of claim 1 wherein the first surface portion is a parallel or diverging surface portion and the second surface portion is converging.

* * * * *

UNITED STATES PATENT AND TRADEMARK OFFICE
CERTIFICATE OF CORRECTION

PATENT NO. : 7,410,604 B2 Page 1 of 1
APPLICATION NO. : 10/382375
DATED : August 12, 2008
INVENTOR(S) : Stanley C. Erickson It is certified that error appears in the above-identified patent and that said Letters Patent is hereby corrected as shown below:

<u>Column 6</u>
Line 26, After "extruder" insert -- . --.

<u>Column 8</u>
Line 25, Delete "8''" and insert -- 8 --, therefor.

<u>Column 9</u>
Line 44, Delete "reiroreflective" and insert -- retroreflective --, therefor.

<u>Column 10</u>
Line 41, Before "The" insert -- . --.

<u>Column 14</u>
Line 6, Delete "comprisinga" and insert -- comprising a --, therefor.

Signed and Sealed this

Twenty-eighth Day of October, 2008

JON W. DUDAS
*Director of the United States Patent and Trademark Office*